US008766616B2

(12) United States Patent
Oyama (10) Patent No.: US 8,766,616 B2
(45) Date of Patent: Jul. 1, 2014

(54) COMPARATOR, CONTROL CIRCUIT OF SWITCHING REGULATOR USING THE SAME, SWITCHING REGULATOR, AND ELECTRONIC EQUIPMENT

(75) Inventor: Manabu Oyama, Kyoto (JP)

(73) Assignee: Rohm Co., Ltd. (JP)

( * ) Notice: Subject to any disclaimer, the term of this patent is extended or adjusted under 35 U.S.C. 154(b) by 241 days.

(21) Appl. No.: 13/315,836

(22) Filed: Dec. 9, 2011

(65) Prior Publication Data

US 2012/0146599 A1 Jun. 14, 2012

(30) Foreign Application Priority Data

Dec. 13, 2010 (JP) .................................. 2010-277374

(51) Int. Cl.
*H02M 3/156* (2006.01)
(52) U.S. Cl.
USPC .......................................... 323/284; 327/87
(58) Field of Classification Search
USPC ........ 323/284; 327/54, 73, 87, 53, 56, 77, 78, 327/89
See application file for complete search history.

(56) References Cited

U.S. PATENT DOCUMENTS 6,549,049 B1 * 4/2003 Hinterscher ................... 327/206
6,879,198 B2 * 4/2005 Kumar et al. ................. 327/206
7,292,083 B1 * 11/2007 Wang et al. ................... 327/205

* cited by examiner

*Primary Examiner* — Harry Behm
(74) *Attorney, Agent, or Firm* — Cantor Colburn LLP (57) ABSTRACT

The present invention provides a comparator with novel output logic. The comparator makes a comparison between an input voltage and a reference voltage. A differential amplifying circuit includes a first input transistor with a control terminal applied with the reference voltage and a second input transistor with a control terminal applied with the input voltage. An output section receives an export signal of the differential amplifying circuit and outputs an output signal that corresponds to the export signal and denotes a result of the comparison. A feedback circuit receives the output signal of the output section, and if the output signal is changed from a first level to a second level, the output signal feeds back to the differential amplifying circuit or the output section while it is restored to the negated level.

8 Claims, 9 Drawing Sheets

COMPARATOR, CONTROL CIRCUIT OF SWITCHING REGULATOR USING THE SAME, SWITCHING REGULATOR, AND ELECTRONIC EQUIPMENT

BACKGROUND OF THE INVENTION

1. Field of the Invention

The present invention relates to a comparator.

2. Description of the Related Art

In an electronic circuit, a comparator has been used to make a comparison between two voltages. The comparator makes a comparison between two input voltages V1, V2 and generates an output signal denoting a result of the comparison. The output signal of general comparator becomes a first level (such as high level) when V1>V2 and a second level (such as low level) when V1<V2.

SUMMARY OF THE INVENTION

However, the other output signal different from the above output signal is needed sometimes according to the different applications of the comparator. Specifically, it is convenient while having a comparator capable of generating the following output signal, i.e. it becomes a first level (such as high level) immediately when one voltage V1 of two voltages is lower than the other voltage V2, and then it restores to a second level (such as low level) immediately regardless of the magnitude of the two voltages V1, V2.

The present invention has been proposed under the circumstances described above. It is therefore an object of the present invention to provide a comparator with novel output logic.

A comparator according to an type of the present invention is provided to make a comparison between an input voltage and a reference voltage, comprising: a differential amplifying circuit including a first input transistor with a control terminal applied with the reference voltage and a second input transistor with a control terminal applied with the input voltage; an output section for receiving an export signal of the differential amplifying circuit and outputting an output signal that corresponds to the export signal and denotes a result of the comparison; and a feedback circuit for receiving the output signal of the output section, and if the output signal is changed from a first level to a second level, the output signal feeds back to the differential amplifying circuit or the output section while it is restored to the negated level.

In this type, if the level of the output signal of the comparator is changed, the output signal of the comparator can be restored to the original level immediately through the feedback circuit. This means that the following output signal can be generated: a level change is occurred while the input voltage intersects the reference voltage, and then it is restored to the original level immediately.

A control circuit of a buck-type switching regulator having a switching transistor and a synchronous-rectification transistor according to other type of the present invention is provided, comprising: a pulse width modulator for generating a pulse width modulation (PWM) signal capable of turning the switching transistor and the synchronous-rectification transistor on/off, and a duty cycle of the PWM signal can be regulated by making a feedback voltage corresponding to an output voltage of the switching regulator to be closer to the reference voltage; a pulse frequency modulator for generating a pulse frequency modulation (PFM) signal capable of turning the switching transistor and the synchronous-rectification transistor on/off, and a duty cycle of the PFM signal can be regulated by making the feedback voltage corresponding to the output voltage of the switching regulator to be closer to the reference voltage; and a mode control portion performing a switching operation between a first mode capable of driving the switching transistor and the synchronous-rectification transistor according to the PWM signal and a second mode capable of driving the switching transistor and the synchronous-rectification transistor according to the PFM signal, and comprising: a comparator having a first input terminal that receives the feedback voltage corresponding to the output voltage and a second input terminal that receives the given reference voltage; and a determining part performing the switching operation from the second mode to the first mode while an output signal of the comparator is changed to a level denoting the feedback voltage that is lower than the reference voltage, which is performed in a period of a gate signal of the switching transistor denoting the switching transistor that is turned off.

In this type, a fluctuation of the output voltage of the switching regulator can be reduced.

A switching regulator according to a further type of the present invention is provided, which includes a control circuit.

An electronic equipment according to a further type of the present invention is provided, which includes a switching regulator.

Other features and advantages of the present invention will become more apparent from the detailed descriptions given below with reference to the accompanying drawings.

BRIEF DESCRIPTION OF THE DRAWINGS

FIGS. 9(a) and (b) are the sequence diagrams illustrating a determining operation related to a switching operation from a second mode to a first mode.

DETAILED DESCRIPTION OF THE INVENTION

The present invention based on the preferred embodiment is described below with reference to the accompanying drawings. The same or equal element, part, or process, contained in each of the accompanying drawings, will be denoted by a same symbol, and the repeat descriptions for them will be omitted suitably. Furthermore, the embodiment should not be limited to the illustrations of the invention. In other words, all of the features and the combinations thereof mentioned in the embodiment are not necessarily the same as the substantive features of the invention.

In the specification, so-called connection between part A and part B includes a directly connection between part A and part B in physically and an indirectly connection between part A and part B through other part that does not affect the electrically connection.

Similarly, so-called a state of part C disposing between part A and part B includes a directly connection between part A and part C or between part B and part C and an indirectly connection between them through other part that does not affect the electrically connection.

First Embodiment

Figure 1:
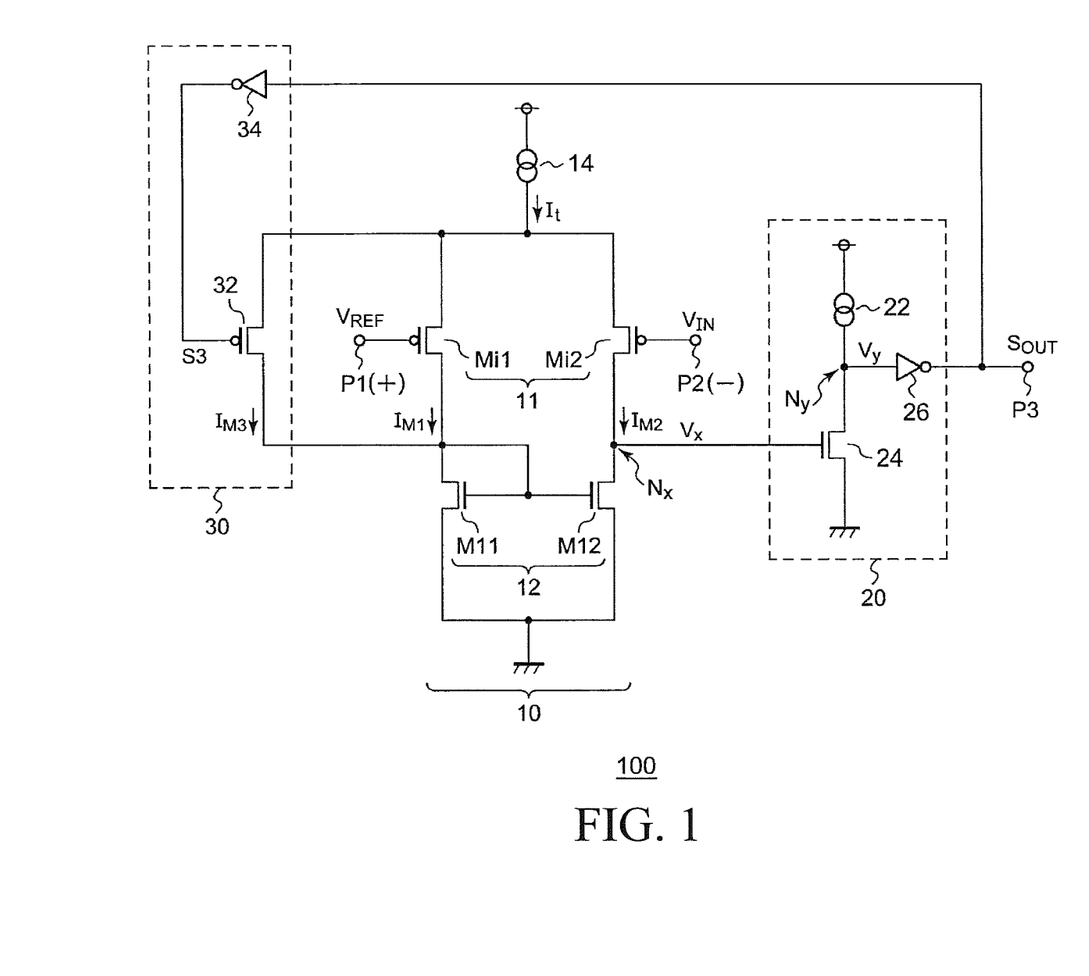
FIG. 1 is a circuit diagram of a comparator according to a first embodiment of the present invention.

FIG. 1 is a circuit diagram of a comparator 100 according to a first embodiment of the present invention. The comparator 100 makes a comparison between a reference voltage $V_{REF}$ inputted to a first input terminal P1 and an input voltage $V_{IN}$ inputted to a second input terminal P2, and outputs an output signal $S_{OUT}$ corresponding to a result of the comparison from an output terminal P3. The first input terminal P1 is a non-reverse input terminal (+) and the second input terminal P2 is a reverse input terminal (−). In the comparator 100, an asserted (high level) output signal $S_{OUT}$ is generated if the input voltage $V_{IN}$ is lower than the reference voltage $V_{REF}$.

The comparator 100 includes a differential amplifying circuit 10 disposed in an input section, an output section 20 and a feedback circuit 30. The differential amplifying circuit 10 includes an input differential pair 11, a current mirror circuit 12 and a tail current source 14. The differential amplifying circuit 10 is a general constitution. The input differential pair 11 includes a first input transistor Mi1 and a second input transistor Mi2, wherein the first input transistor Mi1 and the second input transistor Mi2 are P-channel MOSFETs (Metal Oxide Semiconductor Field Effect Transistor). A control terminal (gate) of the first input transistor Mi1 connects to the first input terminal P1 and is applied with the reference voltage $V_{REF}$. A gate of the second input transistor Mi2 connects to the second input terminal P2 and is applied with the reference voltage $V_{REF}$.

The current mirror circuit 12 is regarded as a load and connects to the input differential pair 11. The gate and source of a transistor M11 are connected to the gate and source of a transistor M12, respectively. The gate and drain of the transistor M11 are connected together. This means that the transistor M11 becomes an input side of the current mirror circuit 12. The current mirror circuit 12 connects to the input differential pair 11 through the input side that receives a current flowing through the first input transistor Mi1. The tail current source 14 supplies a tail current $I_t$ to the input differential pair 11.

The output section 20 receives an output voltage $V_x$ of the differential amplifying circuit 10 and outputs the output signal $S_{OUT}$ corresponding to the output voltage $V_x$. Specifically, the output section 20 receives the voltage $V_x$ appearing at a connection node $N_x$ between the input differential pair 11 and the current mirror circuit 12 and outputs the output signal $S_{OUT}$ corresponding to the voltage $V_x$. FIG. 1 illustrates that the output section 20 receives the voltage appearing at the connection node $N_x$ between the second input transistor Mi2 and the current mirror circuit 12. The constitution of the output section 20 is not limited specially; for instance, it includes a bias current source 22, an output transistor 24 and an inverter 26. A gate of the output transistor 24 is inputted with the voltage $V_x$ from the differential amplifying circuit 10. The bias current source 22 connects to a drain of the output transistor 24 and supplies a bias current to the output transistor 24. The inverter 26 receives a voltage $V_y$ appearing at the drain $N_y$ of the output transistor 24 and changes the voltage $V_y$ to the output signal $S_{OUT}$ capable of denoting high/low level, and then outputs the output signal $S_{OUT}$.

The feedback circuit 30 receives the output signal $S_{OUT}$ of the output section 20, and if the output signal $S_{OUT}$ is changed from a negated level (low level) to an asserted level (high level), the output signal $S_{OUT}$ feeds back to the differential amplifying circuit 10 or the output section 20 while it is restored to the negated level. FIG. 1 illustrates that the feedback circuit 30 feeds the output signal $S_{OUT}$ back to an input portion of the differential amplifying circuit 10.

The feedback circuit 30 includes a feedback transistor 32 and a feedback control circuit 34. The feedback transistor 32 is the same type as the first input transistor Mi1 such as P-channel MOSFET and connects the first input transistor Mi1 in parallel. The feedback control circuit 34 controls the feedback transistor 32 according to the output signal $S_{OUT}$ of the output section 20. Specifically, the feedback control circuit 34 is an inverter which is capable of inverting the output signal $S_{OUT}$ of the output section 20 and outputting the inverted output signal $S_{OUT}$ to a gate of the feedback transistor 32.

The feedback circuit 30 also can be regarded as a portion of a three-input differential amplifying circuit. Accordingly, it is understandable that the feedback control circuit 34 feeds the output signal $S_{OUT}$ back to one of input terminals of the three-input differential amplifying circuit.

Figure 2:
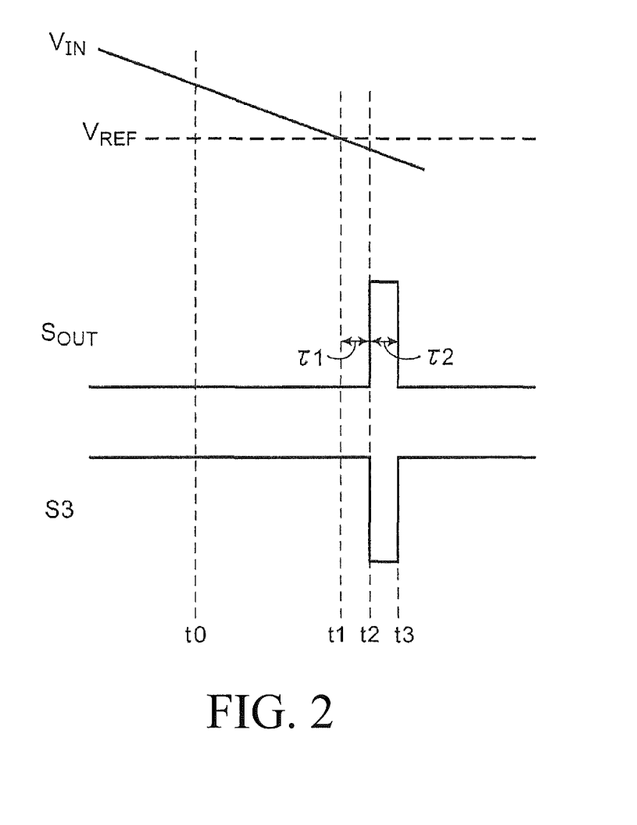
FIG. 2 is a sequence diagram illustrating the operation of the comparator shown in FIG. 1.

The constitution of the comparator 100 was described as mentioned above. The operation of the comparator 100 is described below. FIG. 2 is a sequence diagram illustrating the operation of the comparator 100 shown in FIG. 1. At time point t0, the input voltage $V_{IN}$ is higher than the reference voltage $V_{REF}$, and the tail current $I_t$ flows toward the first input transistor Mi1; meanwhile, the output signal $S_{OUT}$ is low level and a feedback signal S3 is high level, thereby turning the feedback transistor 32 off.

The current flowing through the second input transistor Mi2 is increased while the input voltage $V_{IN}$ is decreased. At time point t1, the input voltage $V_{IN}$ intersects the reference voltage $V_{REF}$. Then the current flowing toward the second input transistor Mi2 becomes larger as the output voltage $V_x$ of the differential amplifying circuit 10 increases and as the voltage $V_y$ decreases. If the voltage $V_y$ is lower than a threshold voltage of the inverter 26, the output signal $S_{OUT}$ is asserted (high level). From time point t1 to time point t2, a delay τ1 is existed.

If the output signal $S_{OUT}$ is changed to the high level, the feedback signal S3 is changed to the low level (ground voltage is 0V) and the feedback transistor 32 is turned on intensely. Consequently, the tail current $I_t$ predominately flowing through the second input transistor Mi2 flows through the feedback transistor 32, and then the output voltage $V_x$ of the differential amplifying circuit 10 is decreased rapidly. If the output voltage $V_x$ is decreased, the output signal $S_{OUT}$ is changed to the low level at time point t3 after a delay τ2, and then the feedback transistor 32 is turned off.

The operation of the comparator 100 was described as mentioned above. According to the comparator 100, the following output signal $S_{OUT}$ can be generated: a level is asserted (high level) immediately while one voltage $V_{IN}$ is lower than the other voltage $V_{REF}$, and then it is negated (low level) immediately regardless of the magnitude of the two voltages V1, V2.

Figure 3:
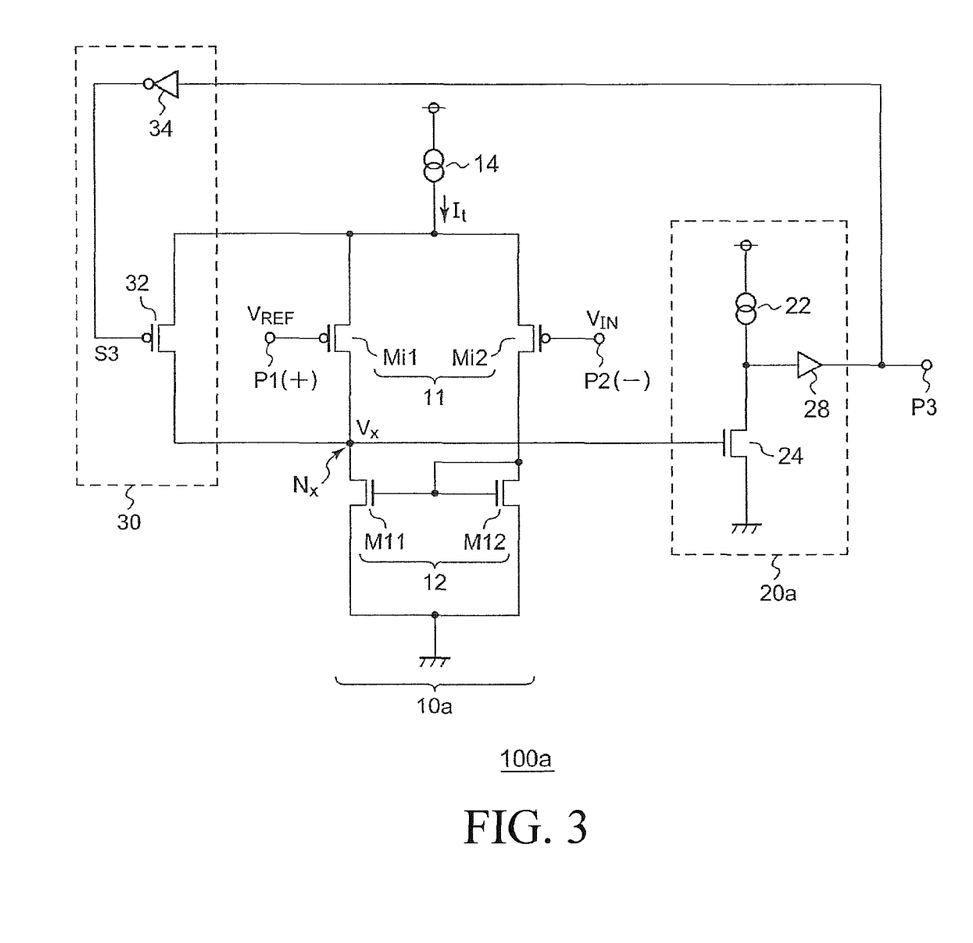
FIG. 3 is a circuit diagram illustrating another embodiment of the comparator shown in FIG. 1.

FIG. 3 is a circuit diagram illustrating another embodiment of the comparator shown in FIG. 1. In FIG. 3, the gate and source of a transistor M12 are connected together and the transistor M12 becomes an input side of a current mirror circuit 12. A differential amplifying circuit 10a outputs a voltage $V_x$ appearing at a connection node $N_x$ between a first input transistor Mi1 and a transistor M11 disposed at an output side of the current mirror circuit 12 to an output section 20a. The voltage $V_x$ shown in FIG. 3 is changed to an opposite side as the voltage $V_x$ shown in FIG. 1. The output section 20a shown in FIG. 3 includes a buffer 28 being substituted for the inverter 26 shown in FIG. 1. An outputted logic level is the same as that shown in FIG. 1 through the buffer 28.

The comparator 100a shown in FIG. 3 also can generate an output signal $S_{OUT}$ that restores to the low level (negated) immediately while a low level (negated) is changed to a high level (asserted), which is the same as the comparator 100 shown in FIG. 1.

Second Embodiment

Figure 4:
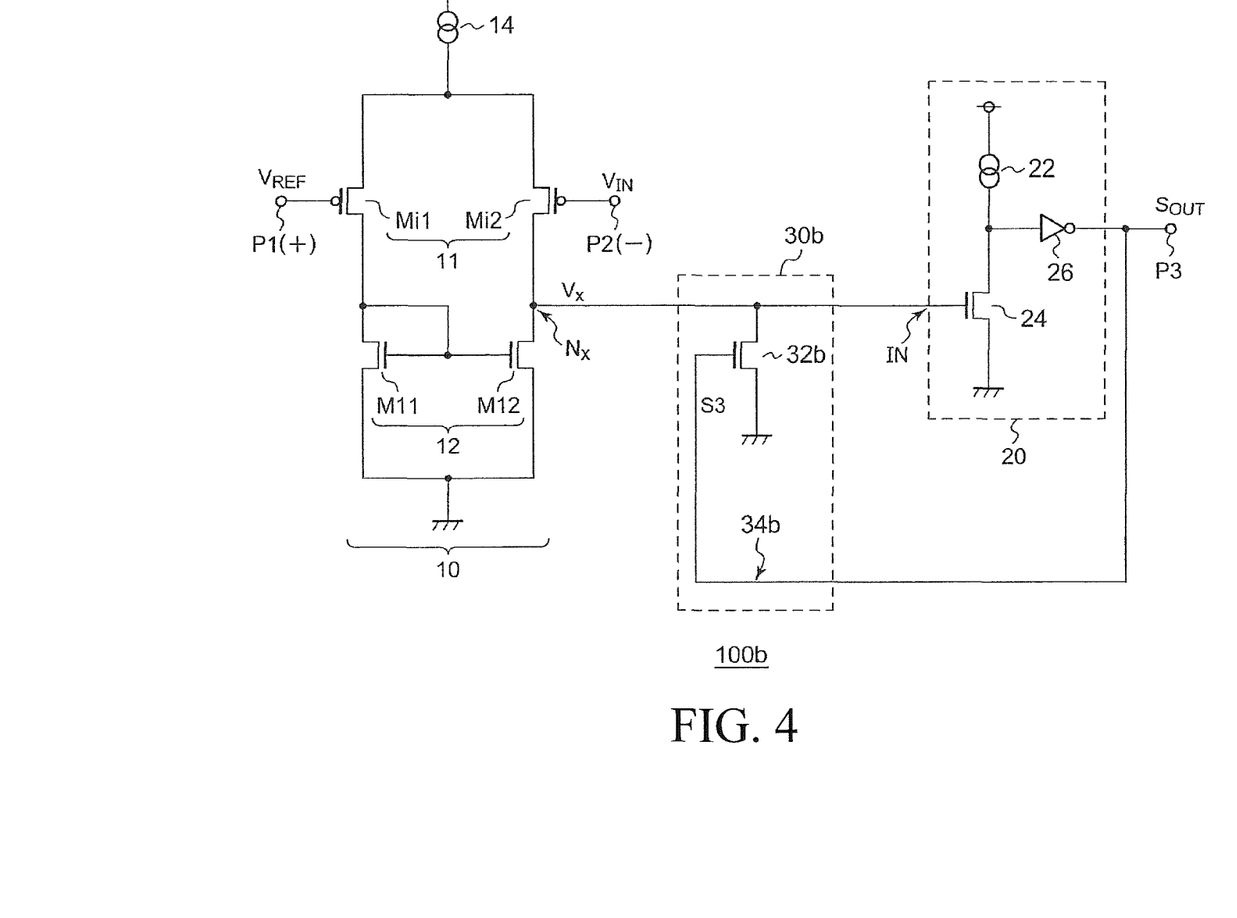
FIG. 4 is a circuit diagram of a comparator according to a second embodiment of the present invention.

FIG. 4 is a circuit diagram of a comparator 100b according to a second embodiment of the present invention. The comparator 100b makes a comparison between a reference voltage $V_{REF}$ inputted to a first input terminal P1 and an input voltage $V_{IN}$ inputted to a second input terminal P2, and outputs an output signal $S_{OUT}$ corresponding to a result of the comparison from an output terminal P3, which is the same as the first embodiment. The first input terminal P1 is a non-reverse input terminal (+) and the second input terminal P2 is a reverse input terminal (−).

In the first embodiment, the feedback circuit 30 feeds the output signal $S_{OUT}$ back to the input of the differential amplifying circuit 10. Compared with the first embodiment, in the second embodiment, the feedback circuit 30b feeds the output signal $S_{OUT}$ back to an input IN of the output section 20. The differential amplifying circuit 10 and the output section 20 shown in FIG. 4 are the same as those shown in FIG. 1.

The feedback circuit 30b includes a feedback transistor 32b and a feedback control circuit 34b. The feedback transistor 32b is an N-channel MOSFET and disposed between the input terminal IN of the output section 20 and a ground terminal regarded as a fixed voltage terminal. The feedback control circuit 34b outputs the output signal $S_{OUT}$ of the output section 20 in itself logic to a gate of the feedback transistor 32b.

The constitution of the comparator 100b was described as mentioned above. The operation of the comparator 100b is described below.

If the input voltage $V_{IN}$ is lower than the reference voltage $V_{REF}$, the output voltage $V_x$ of the differential amplifying circuit 10 is increased, thereby the output signal $S_{OUT}$ is changed to the high level. The feedback transistor 32b receives the output signal $S_{OUT}$, and then its gate voltage S3 is changed to the high level and the feedback transistor 32b is turned on; meanwhile, the input voltage $V_x$ of the output section 20 is drawn down and decreased rapidly. If the input voltage $V_x$ is decreased, the output signal $S_{OUT}$ is changed to the low level.

As mentioned above, the comparator 100b shown in FIG. 4 also can generate the various output signal $S_{OUT}$, which is the same as the comparator 100 shown in FIG. 1.

Figure 5:
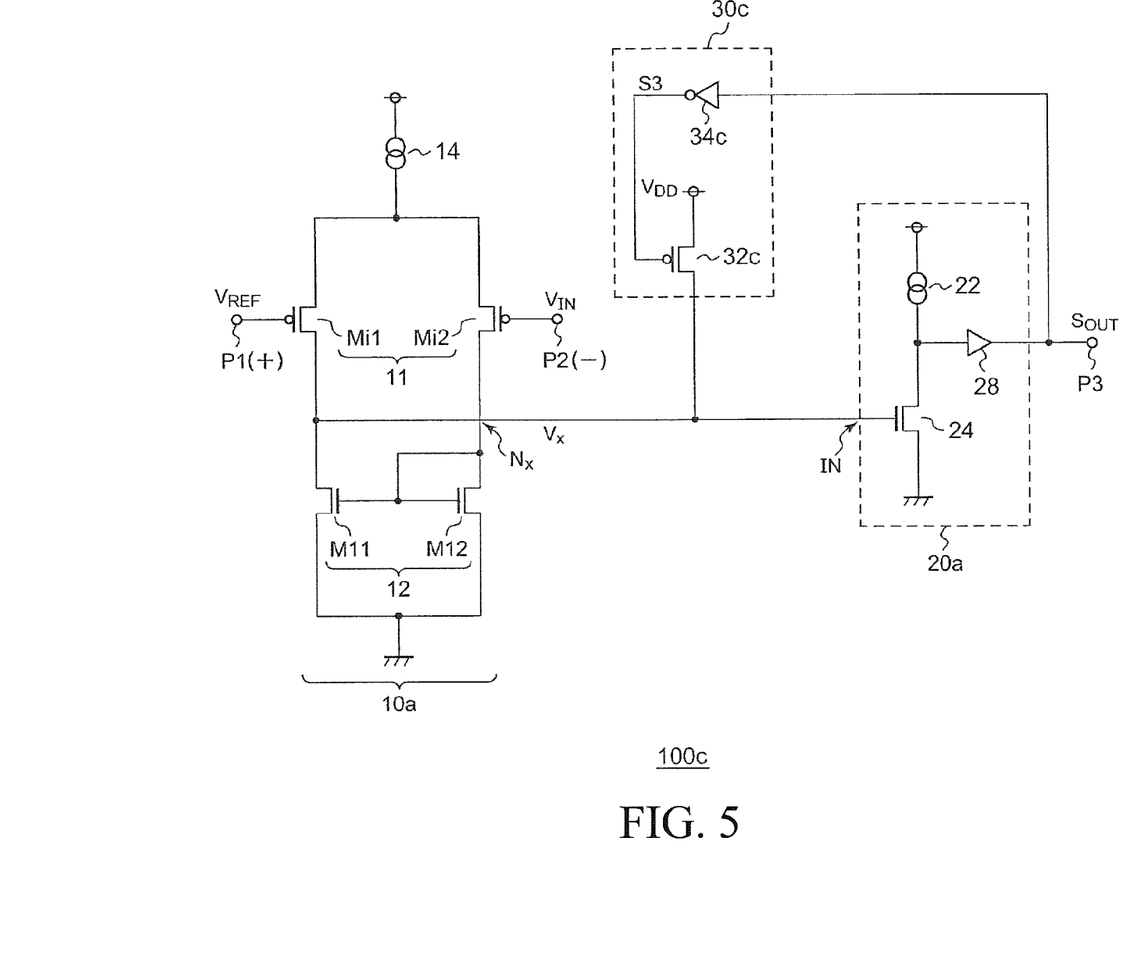
FIG. 5 is a circuit diagram illustrating another embodiment of the comparator shown in FIG. 4.

FIG. 5 is a circuit diagram illustrating another embodiment of the comparator shown in FIG. 4. The differential amplifying circuit 10a and the output section 20a are the same as those shown in FIG. 3. The feedback transistor 32c is a P-channel MOSFET and disposed between the input terminal IN of the output section 20a and a power terminal $V_{DD}$ regarded as a fixed voltage terminal. The feedback control circuit 34c controls the feedback transistor 32c according to the output signal $S_{OUT}$ of the output section 20a. Specifically, the feedback control circuit 34c inverts the output signal $S_{OUT}$ of the output section 20a and outputs the inverted output signal $S_{OUT}$ to a gate of the feedback transistor 32c.

The constitution of the comparator 100c was described as mentioned above. The operation of the comparator 100c is described below.

If the input voltage $V_{IN}$ is lower than the reference voltage $V_{REF}$, the output voltage $V_x$ of the differential amplifying circuit 10a is decreased, thereby the output signal $S_{OUT}$ is changed to the high level. The feedback transistor 32c receives the output signal $S_{OUT}$, and then its gate voltage S3 is changed to the low level and the feedback transistor 32c is turned on; meanwhile, the input voltage $V_x$ of the output transistor 24 is pulled high and increased rapidly. If the input voltage $V_x$ is increased, the output signal $S_{OUT}$ is changed to the low level.

As mentioned above, the comparator 100c shown in FIG. 5 also can generate the various output signal $S_{OUT}$, which is the same as the comparator 100b shown in FIG. 4.

The comparator has been described through some embodiments. The differential amplifying circuit having the differential pair with the P-channel MOSFET was described with reference to FIGS. 1-5. Additionally, the differential pair also can be constituted by the N-channel MOSFET by means of replacing the P-channel MOSFET with the N-channel MOSFET and reversing the power terminal and the ground terminal.

In the embodiments, the output signal of the comparator that is a positive logic was described, i.e. "asserted" is high level and "negated" is low level, including but not limited to the use of an output signal that is a negative logic, i.e. "asserted" is low level and "negated" is high level, which can be achieved by inverting the signal level suitably or replacing the P-channel of the transistor with the N-channel.

Figure 6:
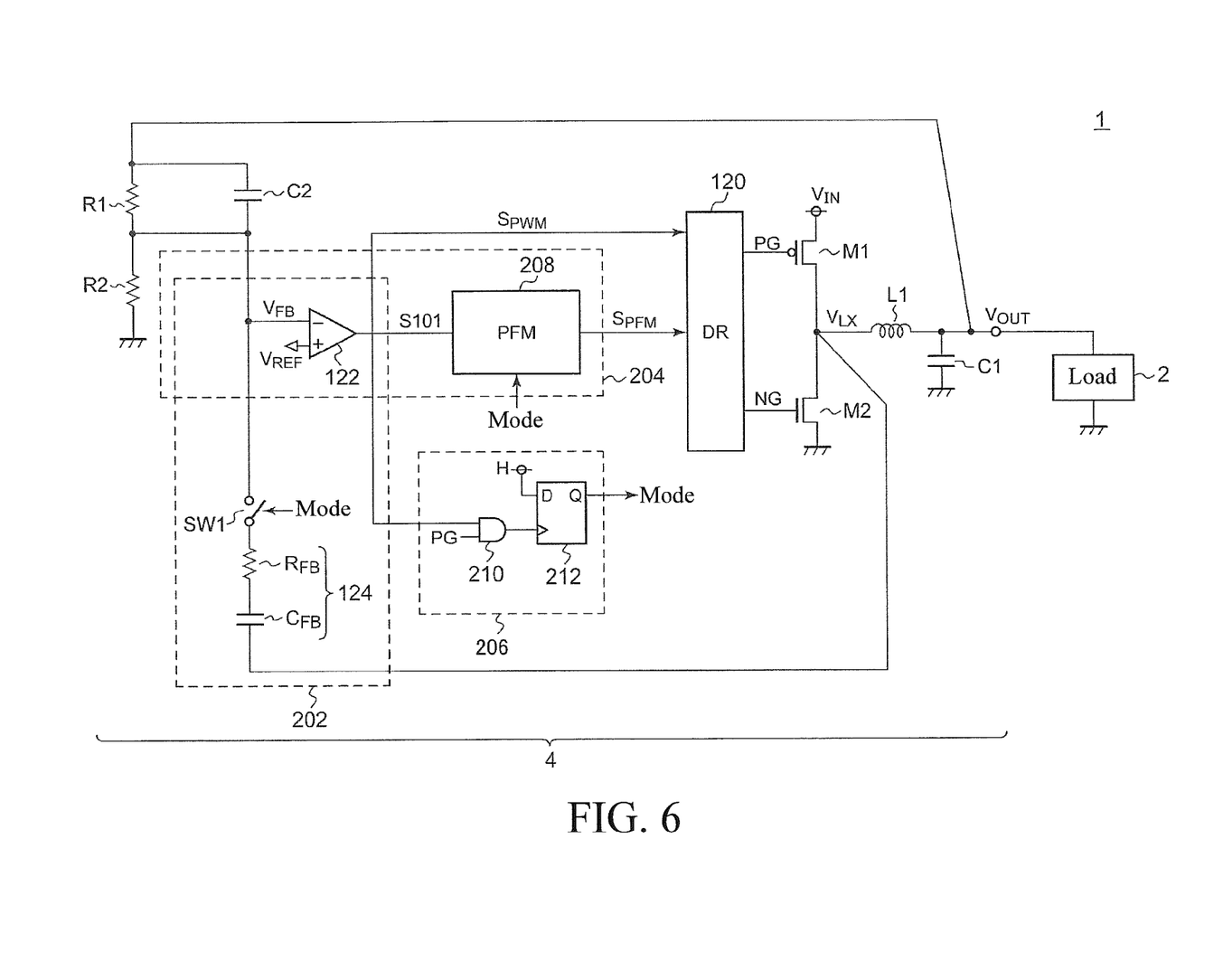
FIG. 6 is a circuit diagram of an electronic equipment having a switching regulator.

The preferred application of the comparator shown in FIGS. 1-5 is described below. FIG. 6 is a circuit diagram of an electronic equipment having a switching regulator.

The electronic equipment 1 is a battery drive device such as handset phone terminal, digital camera, digital video, or PDA (Personal Digital Assistants). The electronic equipment 1 includes a switching regulator 4 and a load 2. The switching regulator 4 is a buck-type switching regulator and receives a DC input voltage $V_{IN}$ from a battery or a power adapter (both are not shown in the drawings), and then an output voltage $V_{OUT}$ capable of reducing and stabilizing the input voltage $V_{IN}$ is generated and supplied to the load 2. The load 2 is an electronic circuit such as DSP (Digital Signal Processor), LCD driver, or audio frequency circuit, which is not limited specially.

The switching regulator 4 includes a control circuit 6, an inductor L1 and an output capacitor C1, which denotes a circumstance that a switching transistor M1 and a synchronous-rectification transistor M2 are disposed in the control circuit 6, including but not limited to other circumstance that the switching transistor M1 and the synchronous-rectification transistor M2 are disposed outside the control circuit 6.

The output circuit having the switching transistor M1, the synchronous-rectification transistor M2, the inductor L1 and the output capacitor C1 is the same as a general synchronous-rectification switching regulator.

The control circuit 6 includes two modulators. The first and second modulators are a pulse width modulator 202 and a pulse frequency modulator 204, respectively. The pulse width modulator 202 becomes active under the condition of high load and generates a PWM (Pulse Width Modulation) signal $S_{PWM}$ being supplied to a driver 120. On the other hand, the pulse frequency modulator 204 becomes active under the condition of low load and generates a PFM (Pulse Frequency Modulation) signal $S_{PFM}$ being supplied to the driver 120. The driver 120 drives the switching transistor M1 and the synchronous-rectification transistor M2 according to the PWM signal $S_{PWM}$ under the condition of high load or the PFM signal $S_{PFM}$ under the condition of low load.

The pulse width modulator 202 is so-called modulator in a manner of hysteresis control, which includes a comparator (error comparator) 122 and a feedback circuit 124. The output voltage $V_{OUT}$ of the switching regulator 4 is divided via the resistors R1, R2, and then the comparator 122 makes a comparison between the divided output voltage $V_{OUT}'$ and a reference voltage $V_{REF}$. The feedback circuit 124 includes a feedback capacitor $C_{FB}$ and a feedback resistor $R_{FB}$, and superimposes a switching voltage $V_{LX}$ appearing at a connection node LX between the switching transistor M1 and the synchronous-rectification transistor M2 on an inverted input terminal of the comparator 122. The pulse width modulator 202 becomes active while a switch SW1 is turned on. A duty cycle of the PWM signal $S_{PWM}$ can be regulated by making a feedback voltage $V_{FB}$ corresponding to the output voltage $V_{OUT}$ of the switching regulator 4 to be closer to the reference voltage $V_{REF}$. Additionally, the constitution of the pulse width modulator 202 is not limited specially, which means that other modulator constituted by an oscillator also can be used.

The pulse frequency modulator 204 regulates a duty cycle (frequency) of the PFM signal $S_{PFM}$ by making the feedback voltage $V_{FB}$ corresponding to the output voltage $V_{OUT}$ of the switching regulator 4 to be the same as the reference voltage $V_{REF}$.

For example, the pulse frequency modulator 204 is a peak current-mode modulator, which further includes a control circuit 208 in addition to the comparator 122.

The comparator 122 makes a comparison between the divided feedback voltage $V_{FB}$ and the reference voltage $V_{REF}$. If the feedback voltage $V_{FB}$ is lower than the reference voltage $V_{REF}$, a high level comparison signal S101 is generated. The control circuit 208 set the PFM signal $S_{PFM}$ to the high level at a time after the comparison signal S101 becomes the high level, thereby turning the switching transistor M1 on and the output voltage $V_{OUT}$ is increased. Next, the synchronous-rectification transistor M2 is turned off at a time. Then if the PFM signal $S_{PFM}$ is changed to the low level, the switching transistor M1 and the synchronous-rectification transistor M2 are turned off. Consequently, the output voltage $V_{OUT}$ is decreased slowly and the comparison signal S101 becomes the high level again. The pulse frequency modulator 204 repeats the operation, thereby turning the switching transistor M1 on intermittently and enabling the level of the output voltage $V_{OUT}$ to be stabilized as the reference voltage $V_{REF}$.

A mode control portion 206 performs a switching operation between a first mode (high load mode) capable of driving the switching transistor M1 and the synchronous-rectification transistor M2 according to the PWM signal $S_{PWM}$ and a second mode capable of driving the switching transistor M1 and the synchronous-rectification transistor M2 according to the PFM signal $S_{PFM}$. The mode control portion 206 uses the output signal S101 of the comparator 122 in a determining operation with respect to a switching operation from a second mode to a first mode. In a period of a gate signal PG of the switching transistor M1 denotes the switching transistor M1 that is turned off, i.e. the gate signal PG at high level, the mode control portion 206 is switched from the second mode to the first mode while the output signal S101 of the comparator 122 is changed to a level (high level) denoting the feedback voltage $V_{FB}$ that is lower than the reference voltage $V_{REF}$.

For example, the mode control portion 206 includes an AND gate 210 and a trigger 212. The AND gate generates a logic product of the gate signal PG and the output signal S101 of the comparator 122. The trigger 212 locks and stores an output of the AND gate 210. The constitution of the mode control portion 206 is provided herein, including but not limited to a constitution capable of performing a determining operation.

Figure 7:
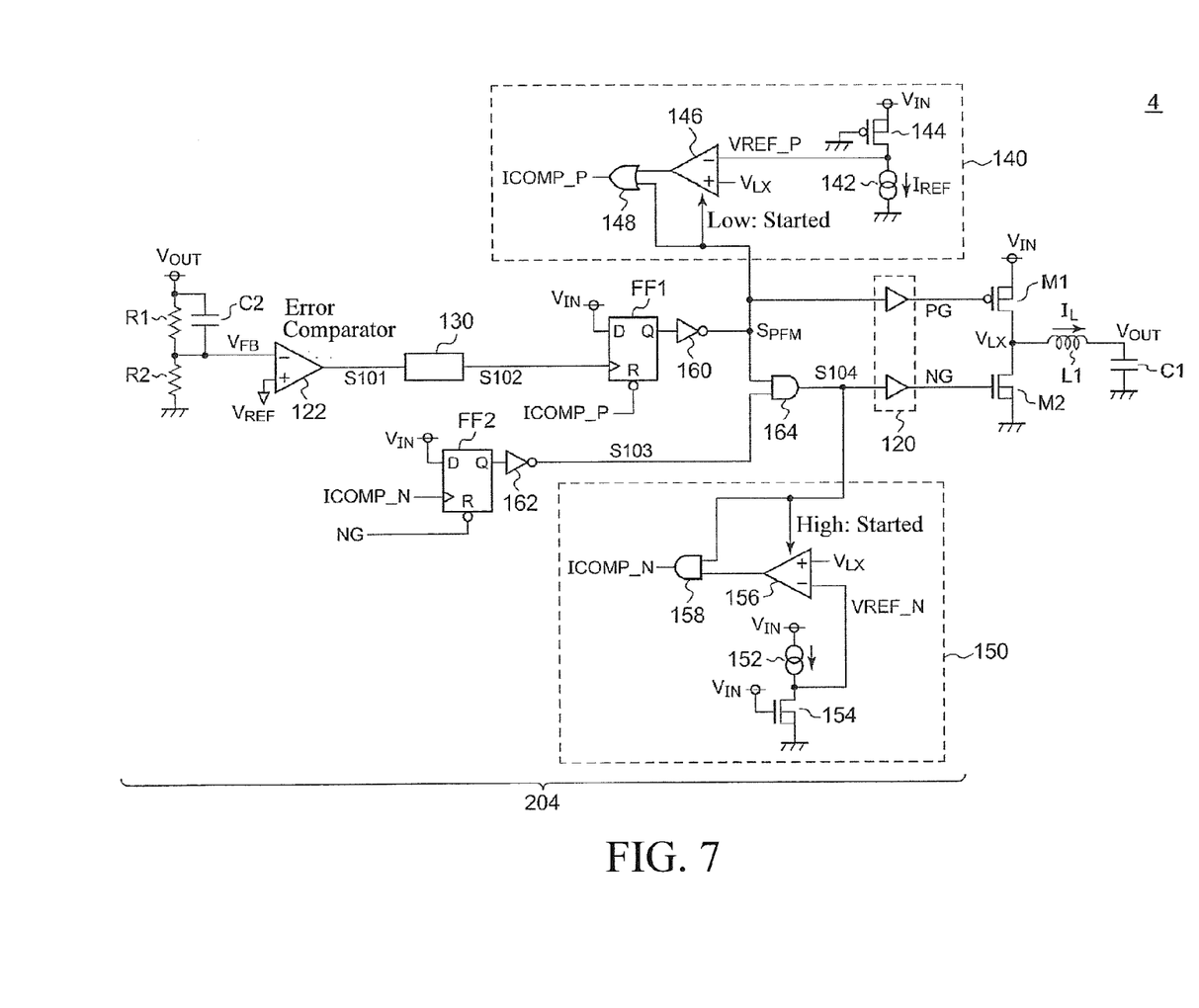
FIG. 7 is a circuit diagram of a pulse frequency modulator related to the switching regulator shown in FIG. 6.

FIG. 7 is a circuit diagram of a pulse frequency modulator 204 related to the switching regulator 4 shown in FIG. 6. The pulse frequency modulator 204 further includes a peak current sensing circuit 140 and a zero current sensing circuit 150 in addition to the comparator 122.

If the comparison signal S101 is changed to the high level, the switching transistor M1 is turned on; meanwhile, the peak current sensing circuit 140 is started. The peak current sensing circuit 140 asserts a signal ICOMP_P (high level) while a current $I_L$ flowing through the switching transistor M1 reaches a given peak current $I_{PEAK}$.

A current source 142 generates a reference current $I_{REF}$ corresponding to the peak current $I_{PEAK}$. If a conduction resistance of a transistor 144 is set to $R_{ON1}$, a reference voltage VREF_P is generated as VREF_P=$V_{IN}-I_{REF} \times R_{ON1}$.

If the conduction resistance of the switching transistor M1 is set to $R_{M1}$, the voltage $V_{LX}$ of the switching terminal LX is provided as $V_{LX}=V_{IN}-R_{M1} \times I_L$. A comparator 146 makes a comparison between the coil current $I_L$ and the peak current $I_{PEAK}$ through a comparison between the voltages $V_{LX}$ and VREF_P. An OR gate 148 acquires a logic sum of an output of the comparator 146 and the signal $S_{PFM}$ to generate the signal ICOMP_P.

The zero current sensing circuit 150 is started in a period of the synchronous-rectification transistor M2 is turned on. The zero current sensing circuit 150 asserts a signal ICOMP_N (high level) while the current $I_L$ flowing through the synchronous-rectification transistor M2 is decreased to a threshold value near to zero. The zero current sensing circuit 150 includes a current source 152, a transistor 154, a comparator 156 and an AND gate 158. The constitution of the zero current sensing circuit 150 is formed by reversing the peak current sensing circuit 140, thereby omitting its description.

Then the switching transistor M1 and the synchronous-rectification transistor M2 are turned off continuously; meanwhile, the output voltage $V_{OUT}$ is decreased. If the feedback voltage $V_{FB}$ is decreased to the reference voltage $V_{REF}$, the comparison signal S101 is asserted, thereby turning the switching transistor M1 on again.

A single triggering circuit 130 receives the comparison signal S101 and generates a signal S102 that is asserted (high level) within a given period from an initial point that the comparison signal S101 has risen. An output of a trigger FF1 becomes the high level while the signal S102 is asserted. An inverter 160 inverts the output of the trigger FF1 to generate the PFM signal $S_{PFM}$. The signal $S_{PFM}$ is inputted to the gate of the switching transistor M1 via the driver 120. This means that the switching transistor M1 is turned on while the comparison signal S101 is asserted.

The signal ICOMP_P is inputted to a reset terminal of the trigger FF1. The output signal of the trigger FF1 is restored to the low level through the signal ICOMP_P. This means that the switching transistor M1 is turned off while the coil current $I_L$ reaches the peak current $I_{PEAK}$.

An output of a trigger FF2 becomes the high level while the signal ICOMP_N is asserted. The trigger FF2 is reset according to the gate signal NG of the synchronous-rectification transistor M2. An inverter 162 inverts the output of the trigger FF2. An AND gate 164 generates a signal S104 denoting a logic product of the PFM signal $S_{PFM}$ and an output S103 of the inverter 162. The driver 120 drives the synchronous-rectification transistor M2 according to the signal S104.

Figure 8:
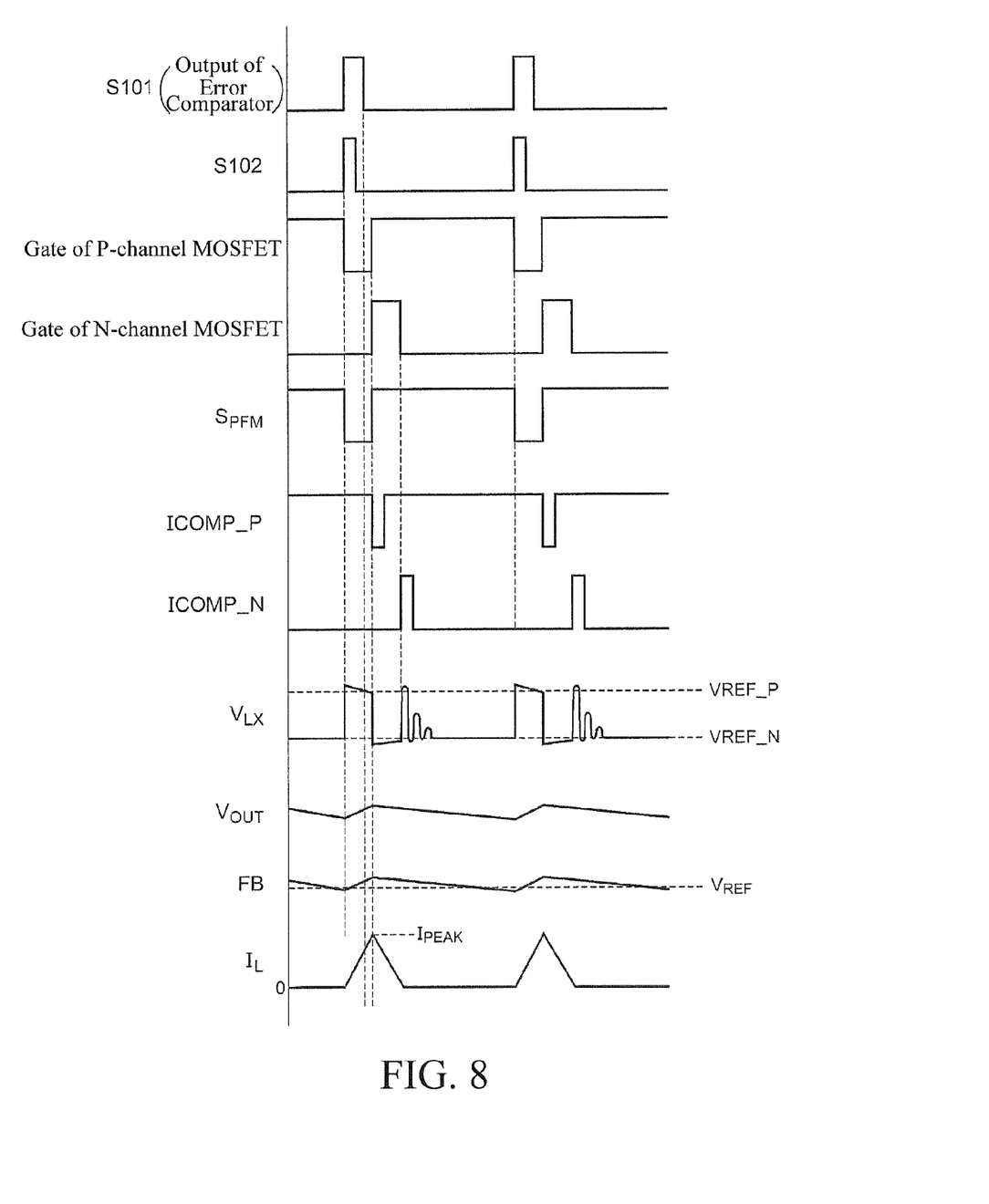
FIG. 8 is a sequence diagram illustrating the operation of the pulse frequency modulator shown in FIG. 7.

The concrete constitution of the pulse frequency modulator 204 was described as mentioned above. FIG. 8 is a sequence diagram illustrating the operation of the pulse frequency modulator 204 shown in FIG. 7.

Referring back to FIG. 6, the comparator shown in FIGS. 1-5 is capable of being applied preferably to the comparator 122 shown in FIG. 6. The reason is that the comparator 122 does no need to sense the feedback voltage $V_{FB}$ that is higher than the reference voltage $V_{REF}$, it is enough that the feedback voltage $V_{FB}$ that is lower than the reference voltage $V_{REF}$ can be sensed.

Figure 9:
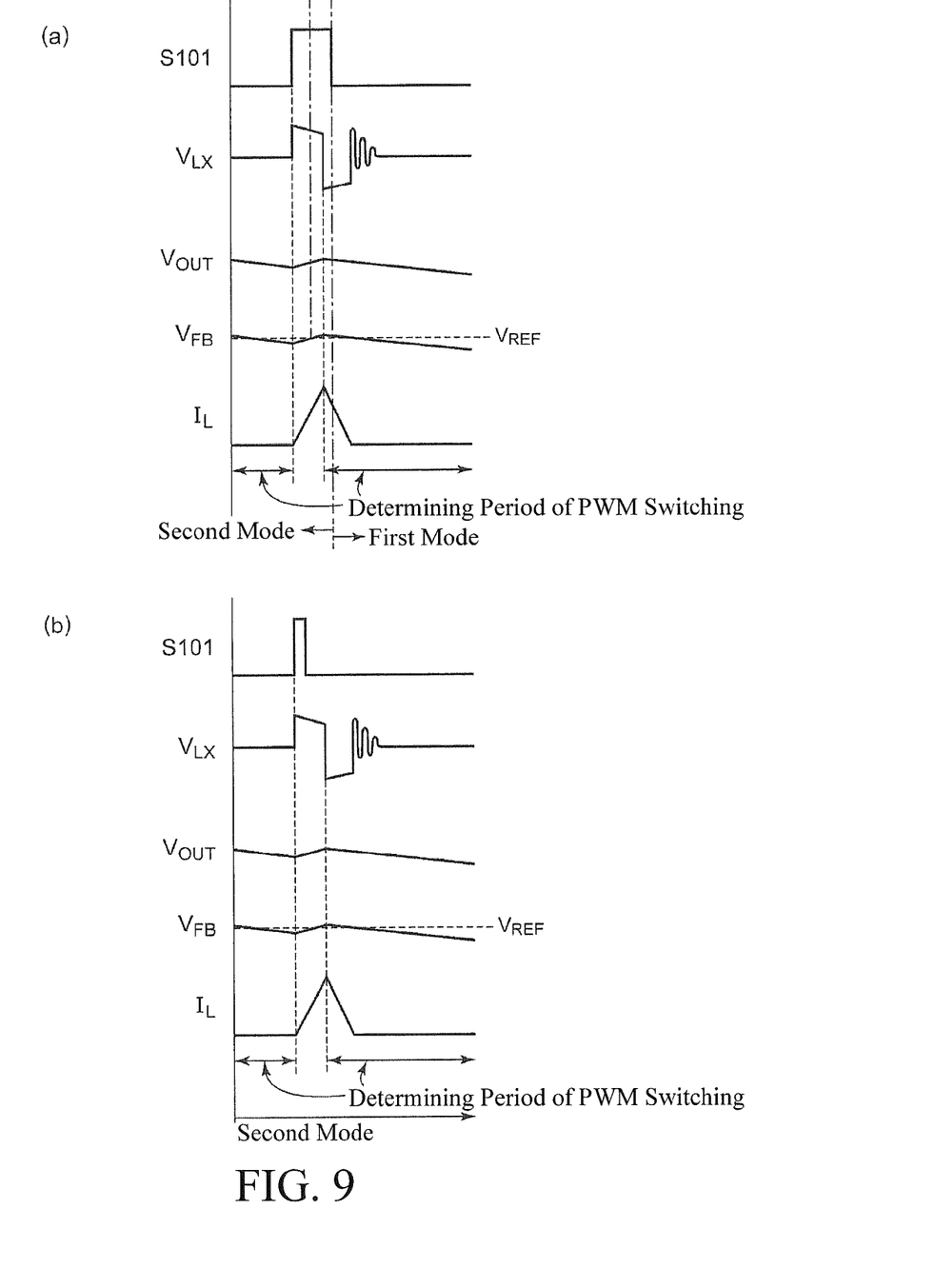

The advantage of regarding the comparator shown in FIGS. 1-5 as the comparator 122 shown in FIG. 6 is described below. The advantage is explicit through a contrast with the comparator 122 that uses a general comparator with the usual output logic. FIGS. 9(a) and (b) are the sequence diagrams illustrating a determining operation related to a switching operation from a second mode to a first mode. FIG. 9(a) illustrates the operation on condition of using the comparator with the usual output logic; FIG. 9(b) illustrates the operation on condition of using the comparator shown in FIGS. 1-5.

Referring to FIG. 9(a), if the general comparator is used, since the comparator 122 has a delay in itself after the output S101 of the comparator 122 becomes the high level, the output S101 of the comparator 122 is still kept at the high level continuously even if the feedback voltage $V_{FB}$ is higher than the reference voltage $V_{REF}$. Consequently, a switching operation to the first mode is still determined even if the output voltage capable of driving the load is generated, thereby the efficiency becomes worse.

Compared with FIG. 9(a), if the comparator shown in FIGS. 1-5 is used, the comparison signal S101 becomes the low level immediately after it becomes the high level. Therefore, the switching operation to the first mode will not be performed and consequently keeps at the second mode; thereby the operation with high efficiency can be realized.

While several embodiments of the present invention have been illustrated and described, various modifications and improvements can be made by those skilled in the art. The embodiments of the present invention are therefore described in an illustrative but not in a restrictive sense. It is intended that the present invention should not be limited to the particular forms as illustrated and that all modifications which maintain the spirit and scope of the present invention are within the scope defined in the appended claims.

What is claimed is:

1. A control circuit of a buck-type switching regulator having a switching transistor and a synchronous-rectification transistor, comprising:
    a pulse width modulator, for generating a pulse width modulation (PWM) signal capable of turning the switching transistor and the synchronous-rectification transistor on/off, and a duty cycle of the PWM signal can be regulated by making a feedback voltage corresponding to an output voltage of the switching regulator to be the same as a reference voltage;
    a pulse frequency modulator, for generating a pulse frequency modulation (PFM) signal capable of turning the switching transistor and the synchronous-rectification transistor on/off, and a duty cycle of the PFM signal can be regulated by making the feedback voltage corresponding to the output voltage of the switching regulator to be the same as the reference voltage; and
    a mode control portion, performing a switching operation between a first mode capable of driving the switching transistor and the synchronous-rectification transistor according to the PWM signal and a second mode capable of driving the switching transistor and the synchronous-rectification transistor according to the PFM signal, and comprising:
    a comparator for making a comparison between an input voltage and a reference voltage, and wherein the comparator comprises:
    a differential amplifying circuit, including a first input transistor with a control terminal applied with the reference voltage and a second input transistor with a control terminal applied with the input voltage;
    an output section, for receiving an export signal of the differential amplifying circuit and outputting an output signal that corresponds to the export signal and denotes a result of the comparison; and
    a feedback circuit, for receiving the output signal of the output section, and if the output signal is changed from a negated level to an asserted level, the output signal feeds back to the differential amplifying circuit or the output section while it is restored to the negated level;
    a first input terminal that receives the feedback voltage corresponding to the output voltage and a second input terminal that receives the given reference voltage; and
    a determining part, performing the switching operation from the second mode to the first mode while an output signal of the comparator is changed to a level denoting the feedback voltage that is lower than the reference voltage, which is performed in a period of a gate signal of the switching transistor denoting the switching transistor that is turned off.

2. A switching regulator, which comprises the control circuit as claimed in claim 1.

3. An electronic equipment, which comprises the switching regulator as claimed in claim 2.

4. The comparator of claim 1, wherein the feedback circuit comprises a feedback transistor parallel connected to the first input transistor and a feedback control circuit controlling the feedback transistor according to the output signal of the output section.

5. The comparator of claim 4, wherein the first input transistor, the second input transistor and the feedback transistor are P-channel MOSFETs, and the feedback control circuit comprises an inverter capable of inverting the output signal of the output section and outputting the inverted output signal to a gate of the feedback transistor.

6. The comparator as claimed in claim 1, wherein the feedback circuit comprises a feedback transistor disposed between an input terminal of the output section and a fixed voltage terminal, and a feedback control circuit controlling the feedback transistor according to the output signal of the output section.

7. The comparator as claimed in claim 6, wherein the feedback transistor is a P-channel MOSFET that is disposed between the input terminal of the output section and a power terminal, and the feedback control circuit has an inverter capable of inverting the output signal of the output section and outputting the inverted output signal to a gate of the feedback transistor.

8. The comparator as claimed in claim 6, wherein the feedback transistor is an N-channel MOSFET that is disposed between the input terminal of the output section and a ground terminal, and the feedback control circuit is capable of outputting the output signal of the output section to a gate of the feedback transistor.

* * * * *